July 7, 1959

H. J. BURT ET AL 2,893,594

BULK STORAGE OF CANS FOR DELIVERY TO AN OPERATING UNIT

Filed Feb. 7, 1956

INVENTORS
HOWARD J. BURT
LOUIS F. JANESEK

BY Mason, Porter, Diller + Stewart

ATTORNEYS

July 7, 1959 H. J. BURT ET AL 2,893,594
BULK STORAGE OF CANS FOR DELIVERY TO AN OPERATING UNIT
Filed Feb. 7, 1956 2 Sheets-Sheet 2

INVENTORS
HOWARD J. BURT
LOUIS F. JANESEK

BY Mason, Porter, Diller & Stewart
ATTORNEYS

United States Patent Office 2,893,594
Patented July 7, 1959

2,893,594
BULK STORAGE OF CANS FOR DELIVERY TO AN OPERATING UNIT

Howard J. Burt, Havertown, Pa., and Louis F. Janesek, Baltimore, Md., assignors to Continental Can Company, Inc., New York, N.Y., a corporation of New York Application February 7, 1956, Serial No. 564,029

3 Claims. (Cl. 221—1)

The invention relates to new and useful improvements in an apparatus for storing and shipping cans in bulk and feeding the stored cans in a single line to an operating unit, and the method employed by the apparatus.

An object of the invention is to provide an apparatus of the above type wherein the cans are stored in independent sleeves rectangular in cross section and dimensioned so that the cans may be arranged side by side with their axes horizontal and in rows one upon another to facilitate the discharge of the cans through an opening at one end of the sleeve.

A further object of the invention is to arrange the sleeves on a shipping pallet so that they stand in an upright position side by side with the bottom openings of the sleeves closed by the platform of the pallet.

A still further object of the invention is to provide a support for the sleeves so that they may be shifted transversely of the sleeves to bring a selected sleeve into alignment with a conveyor having means associated therewith for receiving cans from a storage sleeve and delivering the same in a single line to an operating unit.

A still further object of the invention is to provide means for moving a selected sleeve endwise off from the platform of the pallet to provide a bottom opening through which the cans are discharged by gravity, the extent of movement of the sleeve determining the rate of flow of the cans to the conveyor.

Another object of the invention is to provide a receiving hopper associated with the conveyor and into which the cans are discharged from the storage sleeve, said hopper having means for permitting only a single line of cans to be removed from the hopper by the conveyor.

Another object of the invention is to provide a method of storing and transporting cans in bulk and delivering the same in a single line to an operating unit which method consists in storing the cans in a plurality of separated groups with the cans in each group arranged side by side and with their axes parallel and in rows one above another and discharging one or more of the cans from a selected group by gravity through an opening beneath the lowermost row and delivering the cans discharged from the group in a single line to an operating unit.

These and other objects will in part be obvious and will in part be hereinafter more fully disclosed.

In the drawings which show by way of illustration one embodiment of the apparatus for carrying out the invention:

Figure 6:
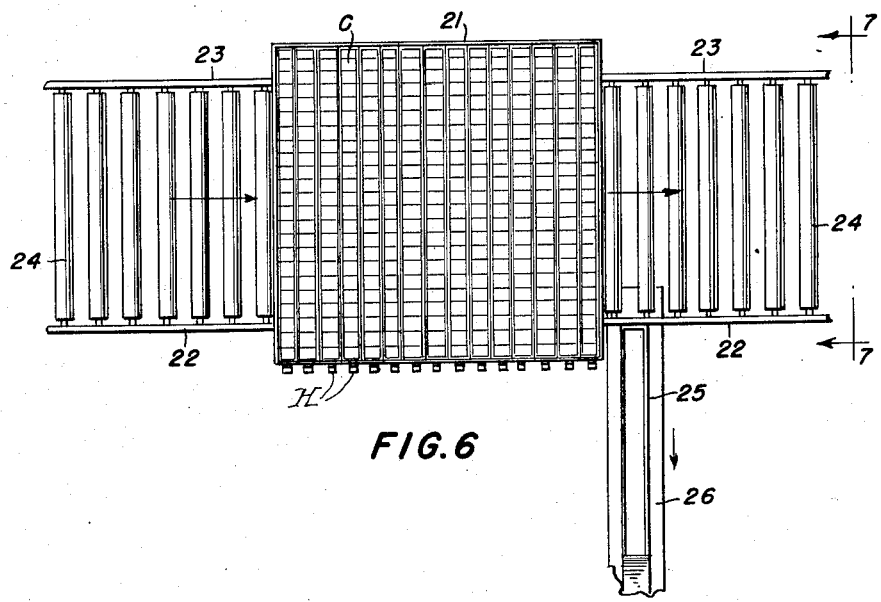
Figure 7:
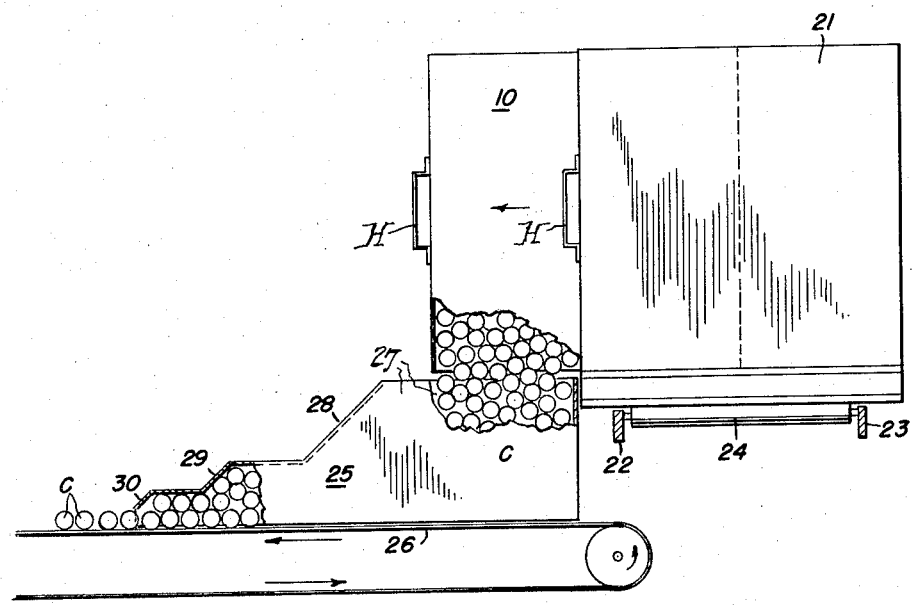

Figure 6 is a view showing in plan a support on which the pallet with the storage sleeves mounted thereon is placed so that it may be moved at will in a direction transversely of the storage sleeves, and also showing a portion of a conveyor for conveying a single line of cans to an operating unit and a hopper associated therewith for receiving the cans from a selected sleeve and directing the same onto the conveyor;

Figure 7 is a view showing one of the sleeves as partially withdrawn from the pallet so as to provide an opening at the bottom end of the sleeve through which the cans are discharged into the hopper and from the hopper onto the conveyor.

The invention has to do with an apparatus for supporting and shipping cans in bulk and feeding the stored cans in a single line to an operating unit.

One of the essential features of the apparatus is a storage sleeve which is rectangular in cross section and dimensioned so as to receive cans arranged side by side with their axes parallel and in rows one on another. A plurality of storage sleeves are placed side by side on the platform of a shipping pallet. The sleeves are placed in upright position so that the bottom opening of the sleeve is closed by the platform of the pallet. After the sleeves have been positioned on the pallet then they are filled with cans arranged in the manner above described. This provides a means for the bulk shipment of cans to a place of use.

At the place of use the pallets are placed on a support preferably provided with rollers so that they may be easily shifted by hand in a direction transverse of the sleeves. Beneath the support for the pallets is a conveyor traveling in a direction at right angles to the support. Associated with the conveyor is a hopper. In unloading the sleeve the operator moves the pallet to bring a sleeve into alignment with the hopper. Then the sleeve is pulled or moved endwise on the pallet platform so as to provide a bottom opening through which the cans fall by gravity from the sleeve into the hopper. The hopper is provided with retaining means so that the conveyor moving beneath the hopper will carry with it only a single line of cans to an operating unit.

Figure 2:
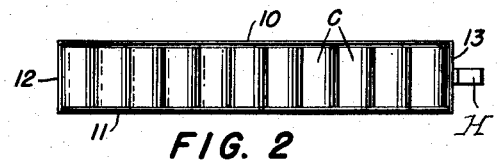
Figure 2 is a top plan view of the storage sleeve.
Figure 1:
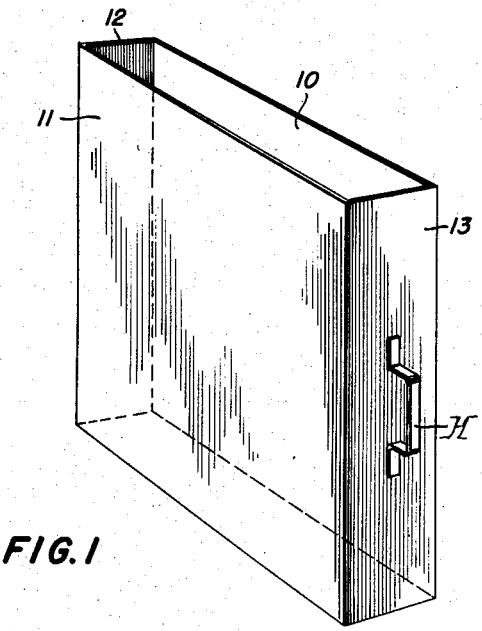
Figure 1 is a perspective view of one of the storage sleeves employed in the storing of the cans in bulk for shipment to a place of use.

Referring more in detail to the drawings the improved storage sleeve is shown in perspective in Figure 1 and in top plan in Figure 2, said storage sleeve is rectangular in cross section and has side walls 10 and 11 and end walls 12 and 13. The sleeve is open at the upper end and also open at the bottom end. This sleeve is dimensioned so as to receive cans indicated at C arranged with their axes perpendicular to the side walls of the sleeve and side by side in rows one above another.

Figure 4:
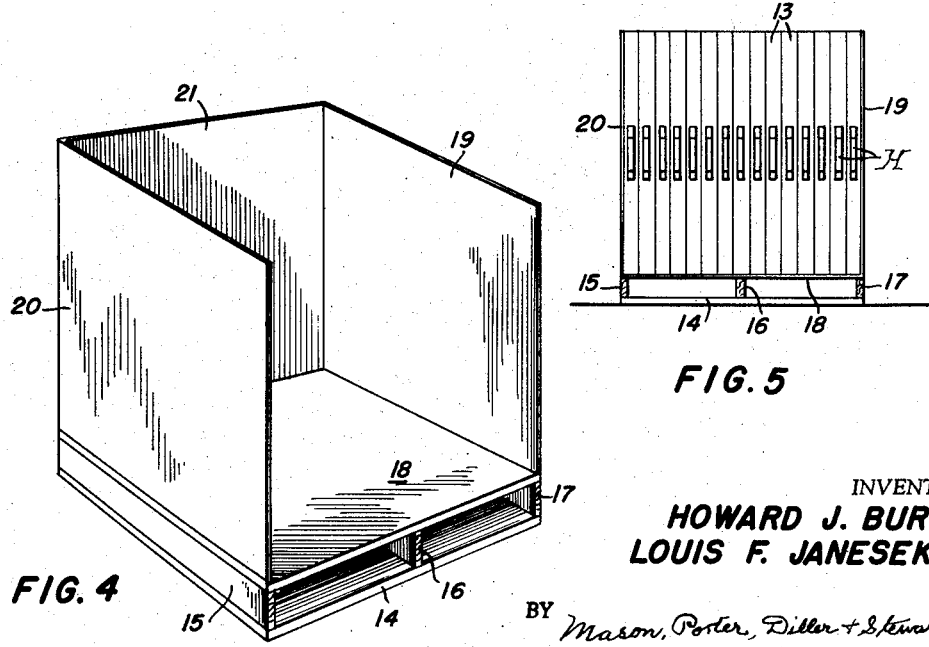
Figure 4 is a perspective view of a pallet of the usual type for storing and shipping merchandise which pallet has been provided with side walls and a rear wall for supporting a plurality of storage sleeves.
Figure 5:
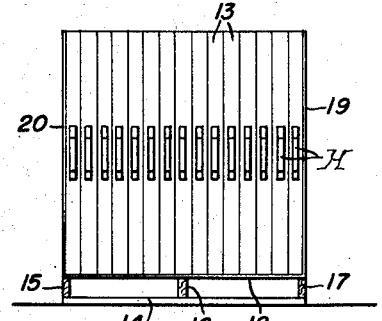
Figure 5 is a front view of a pallet with the storage sleeves arranged therein.

In Figure 4 of the drawings there is shown a shipping pallet which may be of the usual construction. As shown, it includes a base member 14, vertical members 15, 16 and 17 on which are mounted a platform 18. Extending upwardly from the platform is a side wall 19 which extends from the front to the rear of the pallet and is of the same height as the storage sleeves. There are also a similar side wall 20 at the other side of the pallet and an end wall 21 at the rear side of the pallet. These walls are joined so as to make a rigid structure for confining the storage sleeves placed on the pallet. The storage sleeves are placed on the pallet so that the platform 18 serves to close the lower end of the sleeve. A full complement of sleeves is placed on the pallet with the sleeves side by side and extending from one side wall of the pallet to the other side wall as shown in Figure 5.

Figure 3:
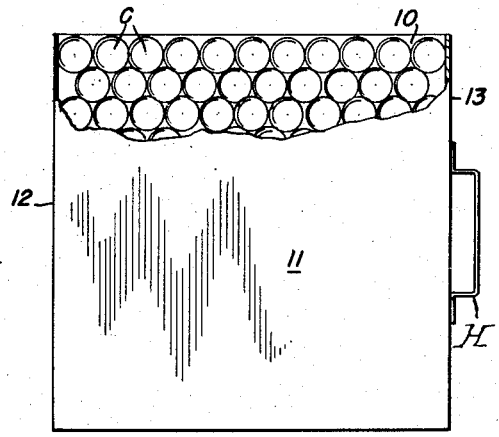
Figure 3 is a side view of the same with one wall of the sleeve broken away to show the preferred arrangement of the cans in the storage sleeve.

In Figure 3 there is shown a desired arrangement of the cans in the sleeve. This makes up a storage unit for cans in what might be termed bulk and the pallet with the loaded sleeves can be easily shipped by trucks or the like to a place of use.

In Figure 6, there is shown an elevated support comprising side members 22 and 23. Journaled in these side members are rollers 24. The pallet is placed on this support and rollers permit the pallet to be moved in a direction at right angles to the sleeves so as to bring a selected sleeve to an unloaded position. Beneath this support is a conveyor of any well known construction. Associated with the conveyor is a hopper 25. The upper strand 26 of the conveyor closes the open bottom of the hopper 25. The hopper has side walls 27, 27 which are spaced substantially the distance of the height of the cans being stored in the sleeves.

Each sleeve has a handle H attached to the end wall 13 thereof. After a pallet has been shifted on the support to bring a selected sleeve into alignment with the top opening in the hopper then the operator grasping the handle may pull or move the positioned sleeve endwise from the pallet so as to partially uncover the opening in the bottom end of the sleeve. (See Figure 7). The cans stored in the sleeves are of cylindrical shape and they readily fall by gravity from the opening at the bottom of the sleeve into the hopper. The rate of discharge of the cans from the storage sleeve is determined by the extent to which the storage sleeve is withdrawn from the pallet platform.

The hopper 25 is provided with inclined sections 28, 29 and 30 which retain and roll the cans so that the conveyor will remove from the hopper a single line of cans only. The section 30 is placed to provide a cut-off wall. In other words, the opening between the lower edge of the inclined portion 30 of the front wall of the hopper and the conveyor is slightly greater than the diameter of the can so that only one can at a time can pass through the opening.

After one of the storage sleeves has been unloaded then the pallet is shifted to bring another storage sleeve into alignment with the hopper and the cans are discharged therefrom.

It is noted that there has been provided in the above apparatus a very simple way of unloading the storage sleeves which enables the cans to be fed very rapidly and continuously to an operating unit. When the cans have all passed out of a storage sleeve another storage sleeve can be brought into alignment and the feed of cans therefrom into the hopper accomplished before the cans are all removed from the hopper by the conveyor.

Applicants have provided in their apparatus a new method of storing cans in bulk for shipment to the place of use and for the quick delivery of the cans to an operating unit. The method consists in storing the cans in a plurality of separated groups with the cans in each group arranged side by side and with their axes parallel and in rows one above another, and removing of the cans from the group by gravity through an opening beneath the lowermost row of the group. In carrying out the method each storage sleeve, after it is placed on the platform of the pallet, is filled with cans arranged with their axes parallel and in rows one above another. A plurality of sleeves is filled thus providing a plurality of independent groups. The plurality of groups are shipped to the place of use and then the cans are discharged from the selected sleeve through the partially uncovered opening at the bottom of the sleeve. These sleeves can be readily filled and shipped to the place of use and the contents of the sleeve discharged therefrom merely by a shifting of the sleeve on the platform.

It is obvious that changes may be made in the apparatus without departing from the spirit of the invention as set forth in the appended claims.

We claim:

1. An apparatus for storing and transporting cans comprising storage sleeves rectangular in cross section open at their top and bottom ends, and dimensioned for storing cans side by side in a plurality of rows one on another with the can axes horizontal so as to dispose the ends of the cans adjacent the respective side walls of the sleeve, a pallet having a platform on which the storage sleeves are slidably supported side by side and in upright position with the open bottom ends of the sleeves closed by the platform of the pallet, an elevated support on which the pallet with the stored cans may be placed and moved longitudinally therealong to selectively place individuals over a discharge station, said sleeves being disposed transversely of the support so that when a sleeve is partially withdrawn a bottom opening will be formed through which the cans may be discharged, there also being included a conveyor for delivering the cans in a single line to an operating unit, said conveyor being arranged at right angles to the support, a hopper associated with the conveyor for receiving the cans as they fall with their axes horizontally disposed from the storage sleeve, said hopper having a cut off wall spaced above the conveyor a distance only slightly greater than the diameter of a can whereby a single line of cans only will be withdrawn from the hopper by the conveyor.

2. An apparatus for storing, transporting and discharging cans in a single line to a conveyor comprising storage sleeves of rectangular cross section, open at their top and bottom, and dimensioned to receive and store cans side by side in a plurality of rows one on top of the other with the axes of the cans horizontal so that the ends of the cans are disposed adjacent to the respective side walls of the sleeve, a pallet comprising a bottom platform, side walls and one end wall, said sleeves being slidably supported side by side on said platform and in an upright position with the open bottoms of the sleeves closed by said platform, an elevated support on which the pallet and sleeves are placed and moved longitudinally of the support to selectively place individual sleeves over a discharge station, said sleeves being disposed transversely of the support so that when a sleeve is partially withdrawn from the open side of the pallet, a bottom opening is formed through which the cans may be discharged, and means for causing the cans to be discharged in a single line only.

3. The method of storing, transporting, and discharging cans in a single line to an operating unit with their axes disposed parallel and across the delivery line comprising the steps of placing a plurality of rectangularly shaped storage sleeves, having open tops and bottoms, side by side in an upright position on a pallet provided with a platform for transportation, with the open bottoms resting on the platform, filling said storage sleeves through their open tops with cans arranged side by side in superimposed rows with the axes of the cans extending horizontally so that the ends of the cans are disposed adjacent to the side walls of the sleeves, placing the pallet with the stored cans on an elevated support with the sleeves extending transversely of the support, withdrawing the sleeves from the pallet endwise one at a time to form an opening to cause the cans to fall from the sleeve full length by gravity, at a rate determined by the extent of the opening, into a hopper positioned near the elevated support and beneath said opening, and delivering said cans from the hopper in a single line to an operating unit with the axes of the cans disposed parallel to each other and across the line of delivery.

References Cited in the file of this patent

UNITED STATES PATENTS

| | | |
|---|---|---|
| 945,658 | Wright | Jan. 4, 1910 |
| 982,092 | Robinson | Jan. 17, 1911 |
| 1,444,031 | Malocsay | Feb. 6, 1923 |
| 1,678,281 | Cole | July 24, 1928 |
| 2,098,844 | Waxgiser | Nov. 9, 1937 |
| 2,174,715 | Baker | Oct. 3, 1939 |
| 2,354,103 | Butler | July 18, 1944 |
| 2,617,699 | Sullivan | Nov. 11, 1952 |
| 2,664,216 | Johnson et al. | Dec. 29, 1953 |
| 2,720,336 | Kosar | Oct. 11, 1955 |